March 25, 1952 L. C. HEAL 2,590,316
ANIMAL TRAP
Filed Aug. 5, 1949
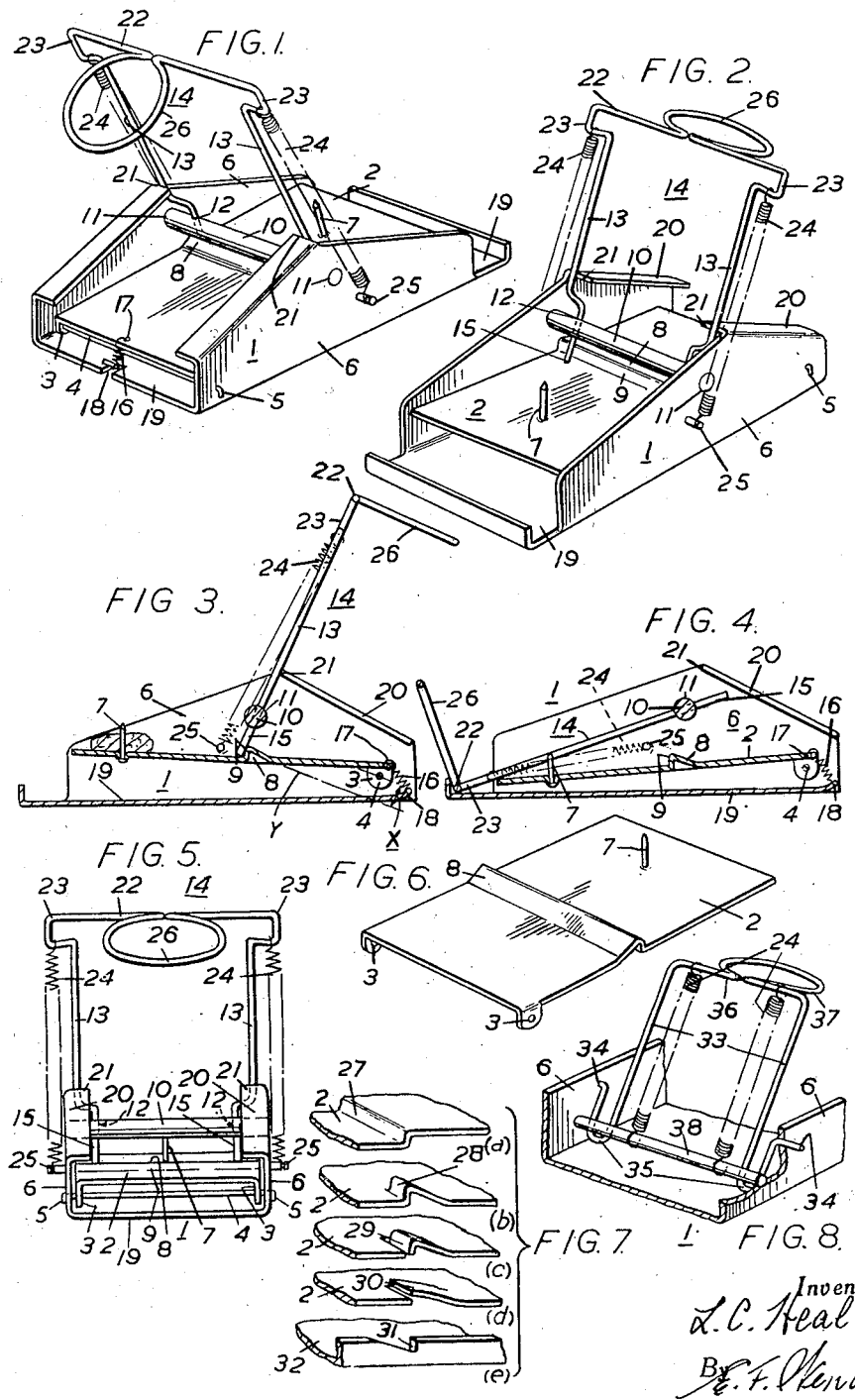
Inventor
L. C. Heal
By F. Okenoroth
Attorney Patented Mar. 25, 1952

2,590,316

UNITED STATES PATENT OFFICE 2,590,316

ANIMAL TRAP

Lionel C. Heal, Winnersh, Reading, England

Application August 5, 1949, Serial No. 108,698
In Great Britain June 20, 1949

6 Claims. (Cl. 43—83.5)

1

This invention relates to an animal trap of the so-called break-back type, in which a pivoted striker, held poised in an open position by a latching element, is spring urged to a closed or trapping position, when the latching element is displaced to effect release of the striker.

It is an object of the present invention to provide an improved break-back trap which is sufficiently sensitive to close on the application of extremely light pressure to striker-releasing means, whilst at the same time being sufficiently robust to withstand hard usage.

Another object of the invention is to provide a break-back trap which can be safely and automatically set, preferably with a single movement, without the risk of trapping the operator's fingers.

A further object of the invention is to provide a break-back trap which, after the trapping therein of a mouse, rat or other animal, can be opened to release the body of the dead animal without the operator's fingers coming into contact with the dead body.

A still further object of the invention is to provide a break-back trap which can be readily and economically made entirely of metal parts.

Another object of the present invention is to provide an animal trap of break-back type wherein a hinged platform is held in a cocked position by means of a pivoted striker which is biassed toward the closed position by spring means which are ineffective to throw down the striker from the cocked position until light pressure on the bait-carrying end of the platform displaces it sufficiently to effect dis-engagement between said platform and the striker.

A further object of the invention is to provide an improved all-metal animal trap comprising a platform located within a channel-shaped base and hingedly connected to said base; an arch-shaped striker pivotally supported above said platform on a transverse axis with the lower extremities of the side limbs of the arch-shaped striker depending toward the platform; abutment faces on the platform adapted for contact with the extremities of the depending striker limbs, and tension springs extending between anchorages on the outer ends of the limbs of the striker and anchorages on the base in positions below the striker axle and off-set to apply a small closing force to the striker when in the open position.

In order that the invention may be more readily understood a preferred embodiment will now be more particularly described with the aid of the accompanying drawings, which also illustrate a number of alternative features of construction.

In the drawings,

Figure 1 is a rear perspective view of the open trap,

Figure 2 is a front perspective view of the open trap,

Figure 3 is a longitudinal section elevation of the open trap,

Figure 4 is a view similar to Figure 3, but showing the trap closed,

Figure 5 is a rear end view of the trap,

Figure 6 is a perspective view of the form of platform used in the trap shown in Figures 1 to 5, Figure 7 shows a number of alternative forms of platforms suitable for use with a trap of the general construction shown in Figures 1 to 5, and Figure 8 is a perspective view of an alternative form of striker suitable for use with a trap of the general construction shown in Figures 1 to 5.

In the embodiment illustrated in Figures 1 to 6 of the accompanying drawings the base 1 comprises a channel-shaped metal pressing within which is located a platform 2 in the form of a flat metal plate. The platform 2 has a pair of eyed lugs 3 at one end for the reception of a hinge pin 4 constituted by a length of stiff wire having its opposite ends passed through holes 5 in the side walls 6 of the base 1, the ends of the wire pin 4 being bent or riveted to prevent its endwise displacement. At the opposite or non-hinged end of the platform 2 a bait-holding spike 7 is provided in the form of a nail or similar pointed element suitably secured to the platform 2. Intermediately of the length of the platform 2 a transverse ridge 8 is provided which provides a stop face 9 for co-operating with the striker. An axle 10, in the form of a metal rod or tube, extends transversely between and is journalled in aligned openings 11 in the opposite side walls 6 of the channel-shaped base 1. The axle 10 is pierced by a pair of spaced apart holes 12 which receive tightly the lower ends of the two side limbs 13 of an arch-shaped striker 14, made of bent wire, the lower extremities 15 of the striker limbs 13 extending down so as to engage the abutment surfaces 9 of the ridge 8 when the platform 2 is in the cocked position. The side limbs 13 of the striker 14 are arranged close to the inside faces of the side walls 6 of the base 1 so that lateral displacement of the striker 14 to an extent sufficient to disengage the axle 10 from the openings 11 is prevented. The platform 2 is normally moved toward the striker-engaging position by means of an out-of-balance force, or light spring means, such as a tension spring 16 having its opposite hooked ends anchored in holes 17 and 18 in the hinged end of the platform 2 and in the floor 19 of the base 1 respectively. At the rear end of the base 1 a pair of inwardly projecting flanges 20 are provided, which are formed integrally with the side walls 6, said flanges 20 serving primarily as finger rests whereby the operator, by applying pressure to the flanges 20, can steady the trap during the setting and releasing operations. The front ends 21 of the flanges 20 serve as stop faces which by contacting with the side limbs 13 of the striker 14 limit the amount of swing of said striker 14 with the axle 10. The striker 14 is formed at the junctions between the side limbs 13 and the crown or cross bar 22 with laterally extending ears 23 which form anchorages for the outer hooked ends of a pair of coiled tension springs 24 disposed one adjacent each limb 13 of the striker 14, and extending on the outsides of the channel side walls 6. The inner hooked ends of said springs 24 engage holes 25 in the side walls 6 of the base 1, the spring-anchoring holes 25 being disposed below the level of the striker axle 10 and offset toward the front end of the trap. The loading of striker 14 by means of springs 24 and 16, in conjunction with the friction set up where the striker limb ends 15 press against the platform abutment surfaces 9 can be neutralised or counteracted by suitably setting the said abutment surfaces 9 so as to alter the degree of offset X between the hinge pin 4 and the line of reaction Y of the force acting between the striker 14 and platform 2. This mode of adjustment in conjunction with the small forward offset of the inner ends of the striker springs 24 permits of securing any desired sensitivity of the platform 2 when in the cocked position, so that a light pressure applied at the bait end of the platform 2 can cause almost instantaneous spring-closing of the trap.

The spring-urged striker 14 is arranged to exert maximum torque about its pivotal axis at a point approximating to the closed or trapping position. In the set or open position the line of action of the striker spring loading passes almost through the axis of pivoting of the striker 14 thereby exerting the maximum torque for closing. In the latter position therefore very little force is exerted on the striker 14 at the abutment faces 9 on the platform 2. The spring loading applied to the platform 2 is sufficient to bring the abutment faces 9 thereof into engagement with the striker 14 in order to assist correct engagement between said striker 14 and said abutment faces 9 and to ensure cocking or setting of the trap by a single movement. However, once the striker 14 has engaged the platform abutment faces 9 spring loading of the platform 2 becomes unnecessary and is in fact a disadvantage as additional force would be required to effect movement of the poised striker. This disadvantage is readily overcome by arranging that the small load from the striker 14 acts through a direction which is offset from the axis of hinging of the platform 2. In this way the spring loading on the platform 2 is allowed to operate only when required, that is, to assist in the cocking or setting action, and its effect is completely neutralized when not required, that is, when the trap is cocked or set.

It will be noted, especially from Figure 4, that the side walls of the base 1 are cut back to clear the ears 23 of the striker 14 when the striker is in the closed position and that the platform 2 terminates short of the striker 14 when closed so that the striker is not pressing down the platform 2 thereby preventing the spring 16 being in tension when the trap is closed.

In the centre of the crown or cross bar 22 of the striker 14 is a looped or ring-shaped hand 26 which extends out substantially perpendicular to the plane of the striker 14 in a direction opposite to that in which the striker 14 moves toward the closed or trapping position. By the use of this handle 26 it is possible, to set the trap and, after the trap has been sprung, to pull up the striker 14 so as to release a trapped animal without the operator's fingers coming into contact with the dead body.

Figure 7 illustrates a number of alternative ways of providing striker-abutment faces on the platform. In the form shown in Figure 6 the front and rear portions of the platform 2 lie in the same plane, the ridge 8 sloping down from the top of the stop face 9 to the level of the rear portion of the platform. In the form shown in Figure 7 (a) the front and rear portions of the platform 2 lie in different planes, being separated by a step 27 which extends right across the platform 2 and constitutes a striker-abutment surface. Figure 7 (b) shows a localised ridge 28 pressed-up from the plane of the platform 2, and Figure 7 (c) and (d) shows two further forms of local stops 29 and 30 respectively which are in the form of tongues pierced in and pressed up from the platform 2. Figure 7 (e) shows how a stop face 31 can be made by notching the top edge of the flange of a channel-section platform 32.

Figure 8 illustrates a modified form of striker in which the axle 10 (Figures 1–5) is dispensed with, by bending back the lower ends of the side limbs 33 and then bending the limb extremities to form axially aligned pivot pins 34 which are journalled in holes 11 in the base walls 6. The bends 35 at the lower ends of the side limbs 33 are adapted to co-act with suitable abutment surfaces on the platform of the trap. The springs 24 are located on the insides of the limbs 33, the upper ends of the springs being anchored to the cross bar 36 (formed with a finger ring 37) and the lower ends to a transverse rod 38 extending between the channel walls 6, said rod 38 serving also as a stop for the striker so that stop faces on the base 1 itself (such as the ends 21 of the flanges 20, Figures 1–5) need not be provided.

I claim:

1. An animal trap of break-back type comprising a base, a platform hinged to said base, a striker pivotally supported on said base and engaging said platform to hold said platform in a cocked position, spring means biassing said striker toward the closed position, said spring means extending between the outer part of the striker and an anchorage on the base below the pivotal axis of the striker and offset toward the bait-carrying end of the platform, and said spring means being ineffective to throw down the striker from the cocked position until light pressure on the bait-carrying end of the platform displaces said platform sufficiently to effect disengagement between said platform and the striker.

2. An animal trap according to claim 1, wherein abutment faces are provided on the platform to co-act with the striker, the relative disposition of the axis of pivoting of the striker, of the axis of hinging of the platform and of said abutment faces on the platform being such that the axis of hinging of said platform lies appreciably offset above the line of reaction of the force acting between the co-acting platform abutment faces and said striker.

3. An animal trap of break-back type, comprising a channel-shaped base; a platform located between side walls of the channel-shaped base and hingedly connected to said base; an arch-shaped striker supported above said platform on a transverse axle means journalled in said side walls of the base, said striker having lower extremities on the side limbs thereof depending toward the platform; abutment faces on the platform adapted for contact with the extremities of the depending striker limbs, and a pair of tension springs, one adjacent each side limb of the striker, each of said springs extending between an anchorage on the outer end of one limb of the striker and an anchorage on the side wall of the base in a position below the striker axle and offset toward the bait-carrying end of the platform.

4. An animal trap according to claim 3, and wherein stop means are provided to limit the amount the striker can swing rearwardly beyond a plane perpendicular to the floor of the base, so as to set the two striker limb extremities opposite said abutment faces on the platform.

5. An animal trap according to claim 4, characterized by the provision on the side walls of the base of bent-over flanges the inner ends thereof constituting said stop means and said flanges being adapted to provide supports for a person's fingers when setting the trap.

6. An animal trap as claimed in claim 3, and wherein the striker-abutment face on the platform is disposed approximately at right angles to the plane of the platform whereby when the striker is in the set or open position the line of action of the striker spring loading passes substantially through the axis of pivoting of the striker to provide minimum torque for the striker closing movement.

LIONEL C. HEAL.

REFERENCES CITED

The following references are of record in the file of this patent:

UNITED STATES PATENTS

| Number | Name | Date |
|---|---|---|
| 1,671,258 | Seghers | May 29, 1928 |
| 2,169,945 | Eslick | Aug. 15, 1939 |
| 2,174,929 | Slutz | Oct. 3, 1939 |